United States Patent [19]

Molini

[11] Patent Number: 5,263,322
[45] Date of Patent: Nov. 23, 1993

[54] METHOD OF RECOVERING ENERGY FROM LIQUIDS IN DEEP CAVITIES

[76] Inventor: Alberto E. Molini, P.O. Box 529, San German, P.R. 00683

[21] Appl. No.: 869,540

[22] Filed: Apr. 15, 1992

[51] Int. Cl.⁵ .............................................. F03G 3/00
[52] U.S. Cl. ........................................ 60/398; 60/721
[58] Field of Search ................. 417/65, 108; 60/641.6, 60/641.7, 398, 721, 641.1

[56] References Cited

U.S. PATENT DOCUMENTS

| | | | |
|---|---|---|---|
| 2,006,985 | 7/1935 | Claude et al. | 122/40 |
| 3,805,515 | 4/1974 | Zener | 60/641 |
| 3,995,160 | 11/1976 | Zener et al. | 290/1 |
| 4,110,980 | 9/1978 | Foulke | 417/108 X |
| 4,180,980 | 1/1980 | Marks et al. | 417/108 X |
| 4,249,383 | 2/1981 | Molini et al. | 60/641 |
| 4,397,612 | 8/1983 | Kalina | 417/108 X |

OTHER PUBLICATIONS

Abstract "Foaming Potential of Cold Deep Sea Water", Hernandez Ruz, Javier and Molini, A. E., 24th ACE Junior Technical Meeting, Mar. 18, 1989.
"The Mist-Transport Cycle: Progress in Economic and Experimental Studies" by A. F. Charwat, R. P. Hammond and S. L. Ridgeway, *Proceedings of the Ocean Thermal Energy Conversion Conference*, Washington, D.C., Jun. 19-22, 1979.
"Preliminary Investigation of a Foam Solar Sea Power Plant" by M. Greenstein, *Proceedings of the Fifth Ocean Thermal Energy Conversion Conference*, Miami Beach, Fla., Feb. 20-22, 1978.
"The Design of Laboratory Scale Experiments On Vertical Two Phase Flow With Application To The Mist Flo Otec Cycle" by S. L. Ridgeway and A. F. Charwat, *Proceedings of the Fifth Ocean Thermal Energy Conversion Conference*, Miami Beach, Fla., Feb. 20-22, 1978.
"Steam Lift Cycle At Very Low Mist Densities" by Earl J. Beck, *Proceedings of The Fourth Annual Conference on Ocean Thermal Energy Conversion*, New Orleans, La., Mar. 22-24, 1977.
"The Foam Otec System: A Proposed Alternative To The Closed Cycle Otec System" by Clarence Zener, *Proceedings of The Fourth Annual Conference on Ocean Thermal Energy Conversion*, New Orleans, La., Mar. 22-24, 1977.
"Recent Developments In The Foam Otec System" by Clarence Zener, Alberto Molini, Tomlinson Fort Jr., John Fetkovich and Martin Greenstein, *Proceedings of the Ocean Thermal Energy Conversion Conference*, Washington, D.C., Jun. 19-22, 1979.
"Inexhaustible Power from Sea Water—a Dream or a Prophecy" by Albert G. Ingalls, *The Scientific American Digest*, May, 1927.
"Thermal Power From Seawater" by J. Hilbert Anderson and James H. Anderson, Jr., *Mechanical Engineer*, Apr. 1966.
"Plant Design and Economics for Chemical Engineers" by Max S. Peters and Klaus D. Timmerhaus, *Chemical Engineering Series*, Third Edition, pp. 551-552.
Chemical Engineers Handbook, Fifth Edition, pp. 6-14 to 6-15.
Shaft Drilling and Boring by Euclid P. Worden.

*Primary Examiner*—Stephen F. Husar
*Attorney, Agent, or Firm*—Buchanan Ingersoll; Lynn J. Alstadt

[57] ABSTRACT

A conduit extends from a platform or a fixed structure above a deep cavity filled with deep liquid which contains dissolved gases. Sufficient liquid is drawn from the top of the conduit to cause gas containing deep liquid to enter the lower end of the conduit and release dissolved gas thereby forming a foam which causes the bulk density of the foam to fall. The change in bulk density causes the foam to move upward through the conduit pushing the foam to higher heights in an effort to reach pressure equilibrium inside and outside the conduit at a level of incipient foaming. The energy of the moving foam is used to drive a turbine or otherwise provide useful energy.

22 Claims, 3 Drawing Sheets

ized potential. The prior art systems
METHOD OF RECOVERING ENERGY FROM LIQUIDS IN DEEP CAVITIES

FIELD OF THE INVENTION

This invention relates to methods of obtaining energy from deep water, other liquids and mixtures thereof found in deep cavities. More particularly the present invention is concerned with methods of utilizing the buoyancy property of gases dissolved in deep liquids to cause the liquid to flow upward through a pipe and then of utilizing the energy contained in the flowing water to generate power.

BACKGROUND OF THE INVENTION

No references can be found for the recovery of hydraulic energy from deep water or other liquids. However, a method for recovering hydraulic energy from the unlimited supply available in deep ocean water is disclosed in my U.S. Pat. No. 5,009,069. Thermal methods have also been proposed for many years for extracting power from surface and deep sea water and most recently have been considered in a series of Ocean Thermal Energy Conversion (OTEC) Conferences which were sponsored by the Ocean System Branch Division of Central Solar Technology, U.S. Department of Energy, and published as proceedings of those Conferences.

None of the many OTEC systems proposed have proved to be practical. They failed because they all require huge warm water flows, as large as 7450 Kg/Sec/MWe, massive structures to process them, vast and expensive heat transfer surfaces and deep water pipes of excessively large diameter. A pipe of about 140 feet in diameter was proposed to recovery 400 MWe of electrically generated potential. The prior art systems are also susceptible to bio-fouling by marine growth which markedly reduces their heat transfer capacity Because of these noted limitations OTEC did not receive the approval of the industrial community; as of this writing there are no facilities in construction or in operation utilizing the prior art OTEC systems.

It has long been known that liquids under pressure can be saturated with dissolved gases. Dissolved gases have been found in deep ocean water. Indeed, the presence of dissolved gases in the water used in OTEC systems was always considered to be undesirable. In such systems one must remove the non-condensable gases to raise the dew point of the water vapor to a temperature above 42° F. to effect condensation of the water vapor. In my U.S. Pat. No. 5,009,069 I teach that when water containing these dissolved gases is extracted from deep ocean water through a vertical conduit the gases form a foam which has a lower bulk density than that found in the body of deep water and is therefore more buoyant. The foam moves upward through the conduit and can be used to produce electrical energy. However, prior to the present invention, the prior art had not recognized that this phenomenon can be utilized to produce energy from liquids found inland.

It is not necessary to find gas containing liquids in deep cavities. One can dissolve gases in liquids by injecting the gases into the liquid under pressure. The stability of gases in liquids depends not only upon the pressure, but also upon the chosen gas and liquid. The literature reports the solubility of nitrogen, oxygen and carbon dioxide in a variety of liquids. The absorption coefficients of these gases in water and six common organic solvents is shown in the following table:

| ABSORPTION COEFFICIENTS OF GASES IN ORGANIC SOLVENTS | | | |
|---|---|---|---|
| GAS | $N_2$ | $O_2$ | $CO_2$ |
| SOLVENT | | | |
| Water | 0.015 | 0.028 | 0.88 |
| Carbon disulfide | 0.049 | — | 0.83 |
| Chloroform | 0.120 | 0.205 | 3.45 |
| Ethyl alcohol | 0.130 | 0.143 | 3.00 |
| Acetone | 0.129 | 0.207 | 6.50 |
| Ethyl ether | 0.240 | 0.415 | 5.00 |
| Benzene | 0.104 | 0.163 | — |

The reported data suggests that the solubility of nitrogen and oxygen in a broad range of organic liquids, for example alcohols and glycols, exceed by approximately six and maybe up to ten times their solubility in water. Because of this increased solubility alcohols and glycols could be used in place of water or in aqueous mixtures for a liquid containing dissolved gases. However, the art has not recognized that such liquids could be used to produce electrical energy.

A low cost system for recovering energy from deep water found inland, free of the negative effects of the weather which is a concern of OTEC ocean installations, would be very useful and effective. It is also worth noting that the present invention of recovering energy from the deep water would not have any negative effects on the environment. Liners are utilized to prevent any contaminated water or other liquid in my system from seeping into another body of water in close proximity to my deep cavity.

SUMMARY OF THE INVENTION

My invention, to be more fully described hereinafter, does not rely on the thermal conversion of energy noted in the prior art. It circumvents the usual thermal constraints and makes the hydrostatic pressure of the deep liquid into the driving potential of the process by taking advantage of the buoyancy of the gases dissolved in deep waters and other liquids by utilizing their effervescence to raise the liquid as a foam above the surface of the body of liquid. The phenomenon is self-sustaining after it has started, as long as the liquid fed into my system is saturated with gases at concentration levels higher than the concentration level of gases in the surface liquid. One can achieve a high level of concentration of gases in a deep liquid by injecting gases into the liquid manually by utilizing a compressor.

The higher solubility of gases in organic liquids such as various alcohols and glycols alone or mixed with water can be utilized to great advantage to recover energy from deep man made bodies of liquids inland. The solubility of air in water is restricted to approximately 14 mL of gas @ STP per liter-atmosphere pressure and does not lend itself very well to be used inland for the recovery of energy. But, the solubility of nitrogen and/or oxygen in glycols and/or high alcohols might reach values approximately as high as 120 mL of gas @ STP per liter-atmosphere pressure. Since the liquid in an inland process would be recycled, the glycols or alcohols and their mixtures with water would be most economical for the working fluid. Their low volatilities would prevent their escaping into the atmosphere as contaminating vapors. Gas solubilities ranging from 14 mL–120 mL @ STP per liter-atmosphere in water-organic liquid mixtures provide a more flexible process permitting a broader range of operation. When the dissolved gases come out of solution from one of these liquids in a vertical conduit they will form a foam which has a lower bulk density than that of the liquid with dissolved gases and is therefore more buoyant. This serves as the route to recover the energy of the hydrostatic pressure of the deep liquids and converts the $\int dP/\rho_{foam}$ into the largest term of the mechanical energy balance of the system.

Conditions can be caused to exist that make it possible to recover energy from deep liquids with a relatively simple process based on the principle of the open U-tube manometer. The U-tube manometer relies on a pressure differential being present between the pressure at one end of the tube and the pressure at the other end of the tube. The pressure differential causes the liquid which is in between the two pressures to move toward the lesser pressure trying to find an equilibrium point. Since the hydrostatic pressure of the deep liquid is much greater than that of the foam at the depth of incipient foaming the differential is continuously present, these conditions will cause the liquid to flow continuously. For my process to work, the deep liquid must contain gases at concentrations higher than saturation levels at the surface. These concentrations can be reached economically by isothermal compression of the gases to be incorporated under pressure at the desired depth at a "cost" of less than 50% of the $\int dP/\rho_{foam}$ energy recovered from the deep liquid. The "cost" when using ethylene glycol and mixtures with water can be estimated to be less than 30% of the energy recovered.

A platform or a similar structure on land supports a vertical pipe, open on both ends, which extends into a body of deep liquid One section of the pipe reaches deeper than 300 m. into the liquid and a shorter section extends above the surface. The pipe can be visualized as one leg of an open U-tube manometer and the liquid column outside of the pipe as the other leg. A compressed gas such as air can be supplied and dissolved near the bottom inlet of the pipe. The gas will dissolve at a rate sufficient to saturate the deep liquid at the operating depth. The flow of deep liquid upward inside the pipe is started by a mechanical means such as pumping until the gas-liquid mixture reaches a depth at which it will be at its saturation pressure and it will effervesce into minute bubbles. Their small size will make their velocity, relative to the liquid, very small. The bulk density of the liquid will be markedly reduced and the liquid-gas pipe system will function as an open U-tube manometer. The outside hydrostatic pressure will push outside liquid into the bottom of the pipe trying to equilibrate the pressure inside and outside the pipe at all depths. At steady state flow conditions, the inflow of outside liquid pushes the previously effervesced liquid upward towards higher levels inside the pipe, while becoming saturated itself and effervescing upon reaching the liquid-gas saturation depth. The mechanism is self-sustained after the effervescence has started because the liquid entering the bottom of the pipe will become saturated with gases. This mechanism makes the hydrostatic pressure of the deep liquid into the driving force of the process In trying to equilibrate the pressure inside and outside the pipe the $\int dP/\rho_{foam}$ is converted into the largest term of the mechanical energy balance of the liquid-gas-pipe system and exerts an upward acceleration force to the effervesced liquid that makes it reach velocities higher than 50 meters per second at the discharge end of the pipe. Its kinetic energy may be utilized as such or converted into potential energy to turn impulse turbines at the discharge end of the pipes.

The pipe and the gases are crucial to the concept. The process will not work without them to form, contain and direct upward the column of foam. This is necessary for the liquid-gas-pipe system to function as one leg of an open U-tube manometer and try to equalize the pressure inside and outside the pipe at all depths.

The saturated level provides the method to control the process by controlling the volume of gas (the compressor) being incorporated into the deep liquid Indeed, for process stability reasons, the liquid entering the bottom of the pipe should contain gases dissolved or dispersed at concentrations corresponding to the desired operating depth. It will minimize variations and yield steady uniform foam flows.

My invention accomplishes the recovery of 100 MWe to more than 400 MWe under a broad set of operating conditions as shown on Table 2 and Table 3.

Prior to this work, it had not been recognized that the above mechanism could be utilized to recover energy from deep liquids on land and sets this concept far apart from all others The solubility of nitrogen, oxygen (air) in water, heavy alcohols and glycols, and aqueous mixtures thereof, is to a large degree increased by high pressures and to a lesser degree by cold temperatures. In water, nitrogen follows Henry's law up to a pressure of 100 atmospheres. Its solubility in water at 25° C. is approximately 14.3 ml. gas at STP per liter-atmosphere. Its solubility in the above liquids follows the same pattern but is approximately four to ten times higher presenting us with a more flexible and less "costly" operation of the process.

The temperature of bodies of deep liquid found inland may decrease from about 28° C. at the surface down to about 5° C. at depths of 1000 m and deeper in the ocean. For man made bodies of deep liquids like glycols, heavy alcohols and their mixtures with water, the pressure increases from atmospheric at the surface at a rate of approximately one atmosphere for every 9.4 m to 10.07 m of liquid increase in depth. Thus, the effect of the temperature and pressure of the deep liquid is toward higher gas solubilities as the deep is increased. The opposite happens when deep liquid is raised to the surface. Use of liquids like glycols and their mixtures with water would reduce freezing and make the concept operable over a broader geographic area on Planet Earth.

At the depth of incipient foaming, defined as the depth at which the liquid-gas mixture will be at its saturation pressure, the degassing will form minute bubbles dispersed in the liquid. These will increase in numbers and size because of the gradual reduction of the pressure as the liquid rises to the surface. The bubbles of gas released from solution form a homogeneous dispersion resembling a foam. The only contribution of the bubbles in making the liquid rise is their formation of the dispersion. Their contribution in physically pushing the liquid upward is minimal, other than by reducing the bulk density of the liquid-gas mixture.

The bulk density of the liquid-gas mixture will be lower than the bulk density of deep liquid at a corresponding level outside the conduit. This will occur at all depths above the point of incipient foaming. The liquid will continue releasing gas as it ascends to the discharge end of the conduit, simultaneously expanding the foam and further reducing its bulk density. This will increase the difference in density between the outside liquid and the dispersion at corresponding depths along the pipe. The hydrostatic pressure outside the pipe will push the liquid-gas mixture upward from the open bottom of the pipe forcing it towards higher levels, trying to balance the hydrostatic pressure inside and outside the pipe at all levels. The pressure inside the foam pipe decreases to atmospheric pressure and a large portion of the dissolved gases effervesce out of solution. After the foam rises above the surface, the foam and liquid recovered therefrom can be used to drive turbines or Pelton wheels.

The rising velocity of the deep water in my system increases to more than 50 meters per second. Its temperature change will be almost negligible on each cycle but the repeated recycling as in a commercial inland installation will heat the liquid because of the friction inside the foam pipe. For this reason, a cooling tower is required to cool the liquid continuously after it is discharged from the turbines and before it is recycled back to the body of deep liquid. Preferably the liquids should be miscible with water to simplify this cooling step. The cooling effect in cooling towers is achieved by evaporating water and we do not want to evaporate the liquids.

One can use conventional means to pump the column of water from the conduit to start the process.

DESCRIPTION OF THE PRESENT PREFERRED EMBODIMENTS

Kinetic Energy Mode

Figure 1:
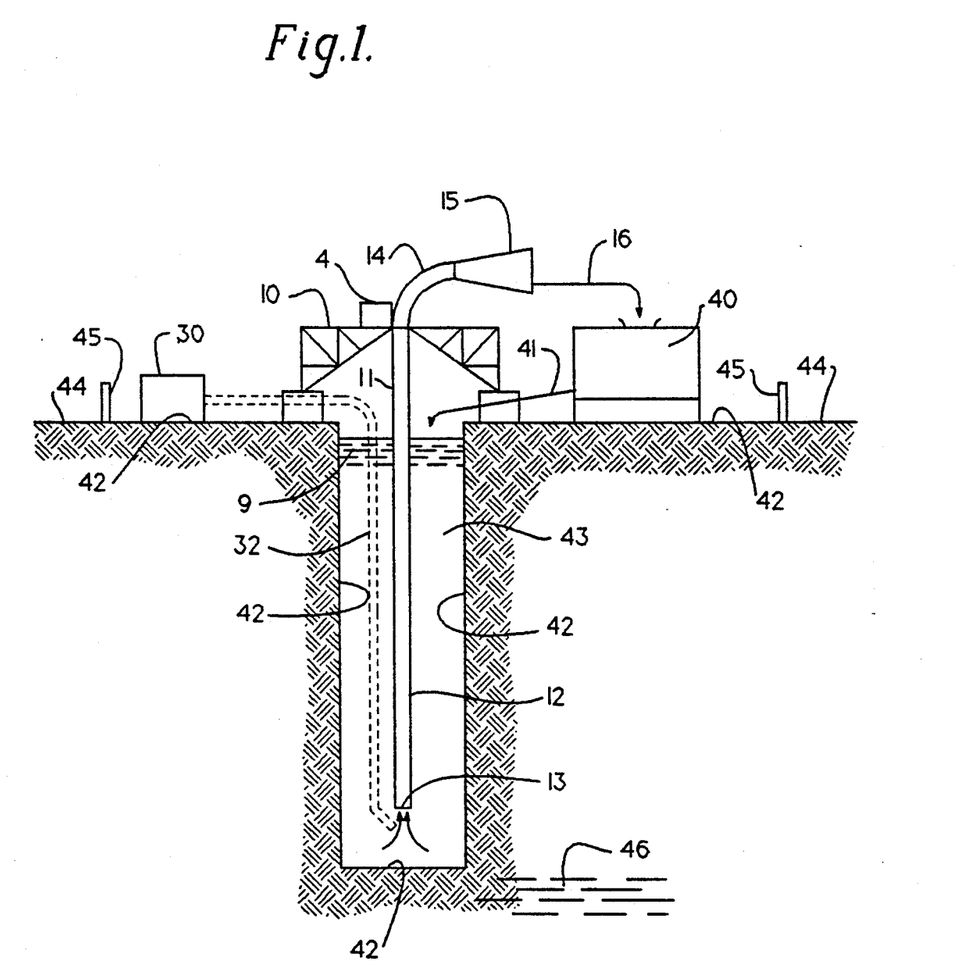
FIG. 1 is a diagrammatic representation of my invention adapted to utilize the recovered energy of Deep Liquid Energy Conversion (DLEC) as kinetic energy only, to inject gases into the deep liquid, to cool the recycled liquid and to prevent seepage to underground and nearby bodies of water.

As shown in FIG. 1, a platform 10, which may be a floating or a fixed structure, is positioned above a cavity 43 which is open at ground level 44, which contains a liquid 9 and which extends deep below the ground. A substantially vertical conduit section 11 extends above the surface of the liquid 9 and a longer vertical conduit section 12 extends below the liquid surface. A compressor 30 on ground level supplies compressed gases through pipe 32 which are incorporated into the liquid near open end 13 of conduit section 12. Conduit 32 may be vertical or inclined. The upper end 14 which may be a manifold is connected to the input end of one or more impulse hydraulic turbines, such as Pelton wheels 15. The deep liquid with its gases enters the open end 13 of conduit section 12 and forms a foam as it rises achieving velocities higher than 50 m per second. The concentration of gases will depend upon where the liquid gas saturation depth is located along conduit section 12 which may be in the order of 300 to 1000 meters in length or even longer. The pressure of the liquid at a depth of approximately 1000 meters or so is approximately 100 atmospheres and the concentration of dissolved gases at that depth in the case of alcohols or glycols should be near six to ten times the 1428 ml. of gas at standard temperature and pressure per liter of deep water depending on the working fluid used. The release and expansion of dissolved gases causes the foam to rise in conduits 11 and 12 in the manner previously described. Means 4 are provided for drawing the initial column of liquid from conduit 11. The moving foam is introduced by manifold 14 into a turbine or Pelton wheel 15 which may be connected to generators of electricity (not illustrated). The formerly dissolved gases escape from the liquid to the atmosphere while the liquid flows out at 16 and is recycled via the cooling tower 40 where it is cooled of the heat effects of the flow friction. Recycling of liquid back to the body of deep liquid 9 maintains the liquid at a desired level. The structure can be designed to eliminate potential environmental hazards by providing the body of deep liquid with lining 42 to prevent seepage to underground bodies of water 46 and also providing the recycle conduits 41. The ground 42 within the retention wall 45 could be lined to prevent water seepage to underground bodies of water 46.

Potential Energy Mode

Figure 2:
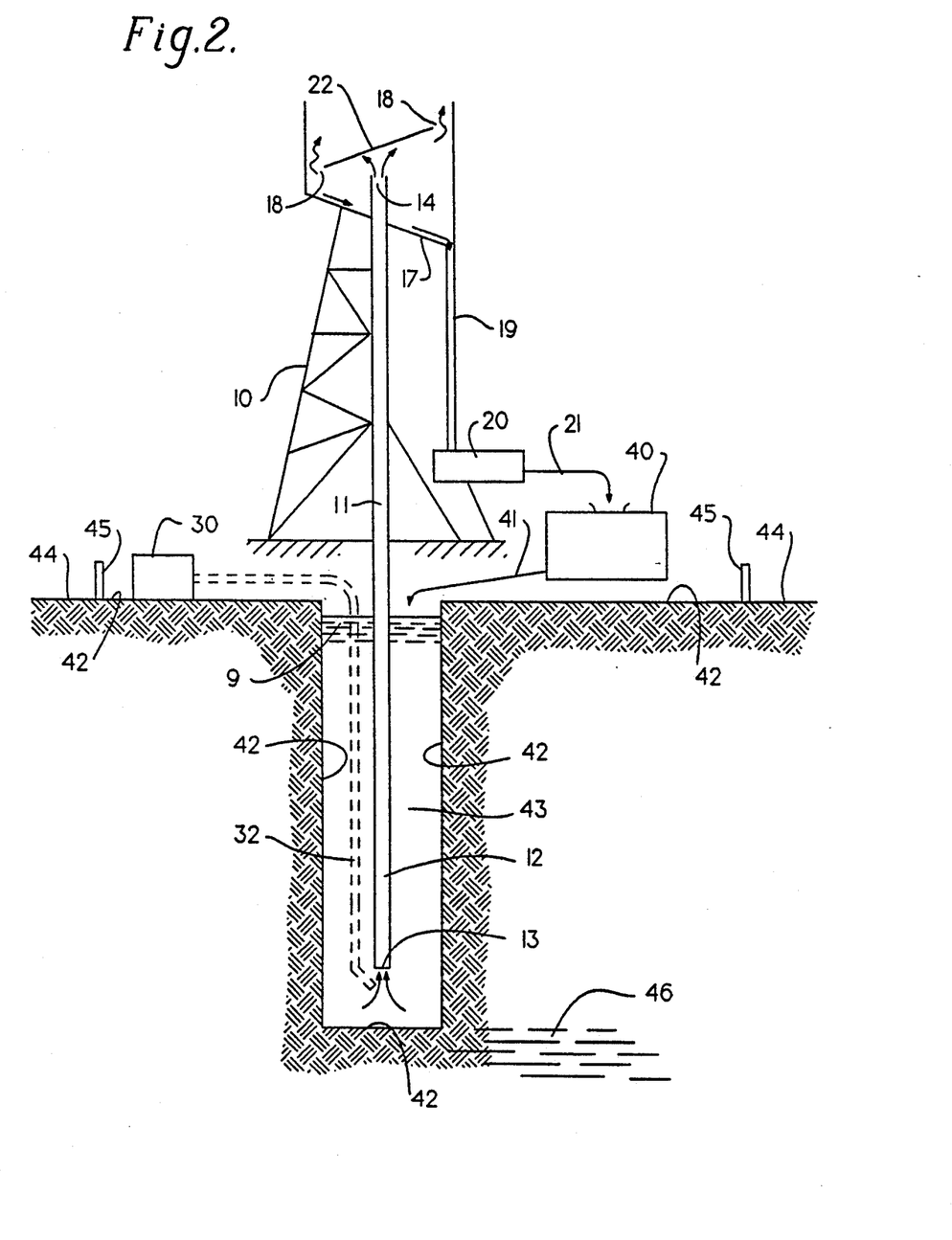
FIG. 2 is a diagrammatic representation of my invention adapted to utilize the recovered energy of DLEC as potential energy only, to inject gases into the deep liquid, to cool the recycled liquid and to prevent seepage to underground and nearby bodies of water.

The energy of the moving liquid can also be transformed into potential energy as shown in FIG. 2. Reference characters in FIG. 2 which duplicate those of FIG. 1 identify identical elements. In FIG. 2 the supporting means and underwater structures are the same as those of FIG. 1. The upper section 11 of the conduit is considerably higher above the liquid surface level than the conduit section 11 shown in FIG. 1. The gases cause the liquid to foam and rise from lower end 13 of the conduit located in the deep liquid to above the liquid level through upper section 11 into a foam breaker 17, which contains gas escape apertures 18 and a cover 22. The liquid, separated from its gases which evaporate into the atmosphere, runs along the inclined floor in foam breaker 17 into a take-off conduit 19, which directs the flow into a turbine or Pelton wheel 20, which may be connected to a generator of electricity. The discharge from turbine 20 at 21 is liquid which is recycled back to the deep liquid body via the water cooling tower as described in FIG. 1. This embodiment can also eliminate potential environmental hazards by providing the body of deep liquid with lining 42 to prevent seepage into underground bodies of water 46 and also providing the recycle conduits 41. Retention wall 45 serves as in FIG. 1 and the ground within its confines is lined 42 to prevent seepage.

Kinetic-Potential Energy Mode

Figure 3:
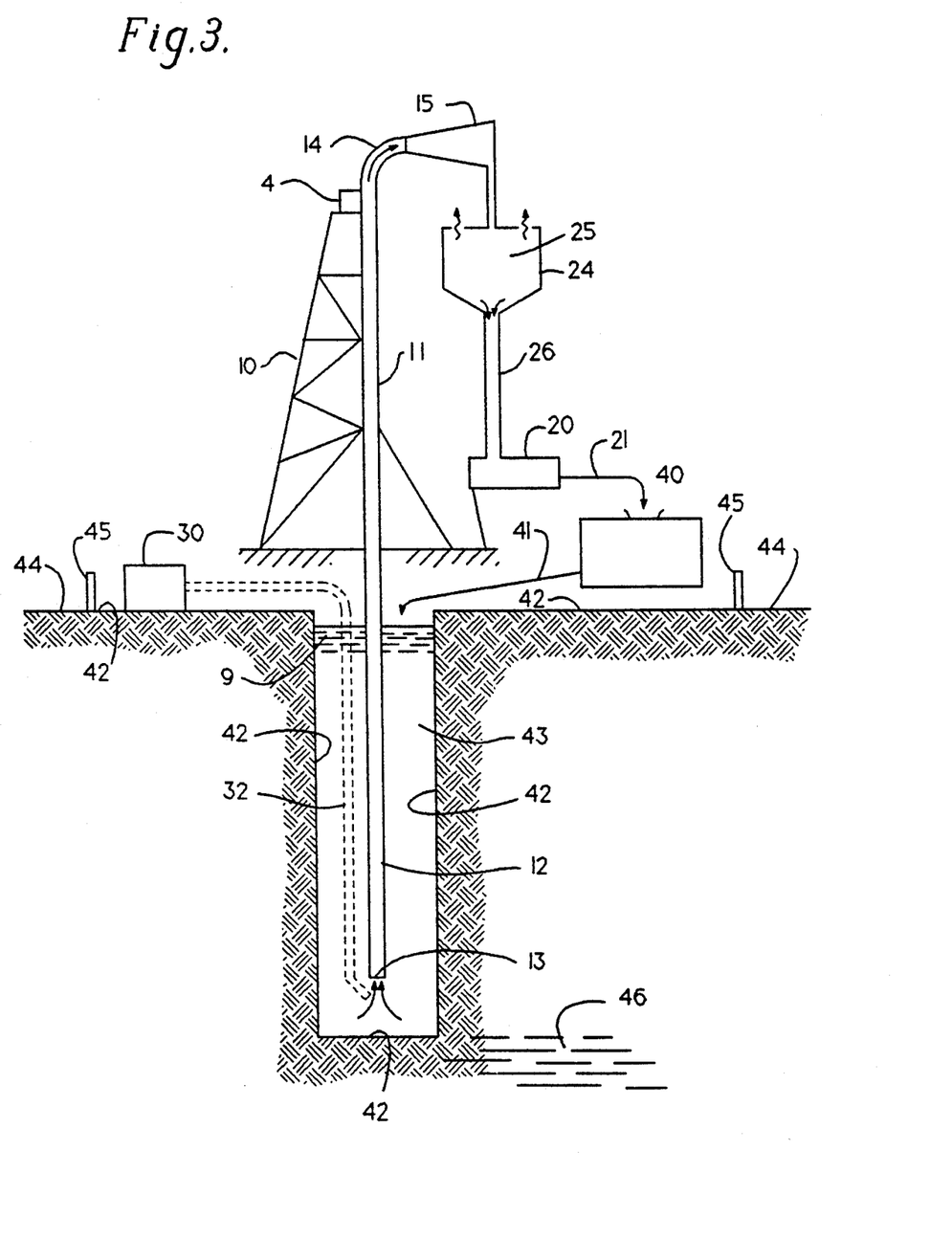
FIG. 3 is a diagrammatic representation of my invention adapted to utilize the recovered energy of DLEC as both kinetic and potential energy, to inject the gases into the deep liquid, to cool the recycled liquid and to prevent seepage of underground and nearby bodies of water.

One can utilize Deep Liquid Energy Conversion as both potential energy and kinetic energy in the manner shown in FIG. 3. Reference characters which duplicate those of FIGS. 1 and 2 identify identical elements. Upper vertical section conduit 11 through manifold 14 leads into turbines or Pelton wheels 15 which, as in FIG. 1, may be further connected to generators of electrical power. The discharge from the turbine or Pelton wheel 15, which is largely foam, is directed into foam breaker 24 from which gases escape at 25. Separated liquid drains through a conduit 26 into a turbine or Pelton wheels 20, which may also be connected to electrical generators. Liquid is discharged from turbine 20 through discharge pipe 21 and recycled back to the deep cavity 43 containing liquid 9 via cooling tower 40 as described with regard to FIG. 1. This embodiment can be constructed to absolutely eliminate potential environmental hazards by providing a lining 42 around cavity 43 and recycle conduits 41.

The compressor 30 shown in FIGS. 1, 2 and 3 is required to compress the gases to be dissolved in the deep liquid to saturate the liquid at the depth of incident foaming to recover energy. The gases are injected into the deep water near inlet 13 through an optional pipe 32 shown in chain line in FIGS. 1, 2 and 3. The elevated pressure of the deep liquid increases the solubility of gases. Therefore, gases injected into the liquid near inlet 13 should readily dissolve and then go out of solution in vertical conduit portions 11 and 12. In this way, my system can be used in bodies of deep water having little dissolved gases by increasing the quantity of dissolved gases to a sufficient saturated concentration of gases to liquid. Such an increase should increase the flow rate through the conduit 12. Conduit 12 must be vertical. Pipe 32 could be vertical or inclined.

My invention is based on the premise that deep water can be made to contain dissolved gases at saturation concentrations to make possible the generation of electrical energy. With water those concentrations would be higher than 300 mL of gas at STP/liter of deep water at a depth of at least 300 meters. Since the hydrostatic pressure at 1000 meters is approximately 100 atmospheres, the gas concentration at 1000 meters should be approximately 1428 mL of gas at STP/liter of water. With liquids like glycols, high alcohols and their mixtures with water the saturation level could be approximately as high as 120 mL of gas @ STP per liter per atmosphere pressure.

The mechanical energy balance of my water-gas-pipe system predicts the behavior of the system under widely different operation conditions. The $\int dP/\rho_{foam}$ becomes without any doubt the largest term of the balance. It demonstrates the large effect that the gases exert to recover the energy of the hydrostatic pressure of the deep liquids by merely decreasing the bulk density of the liquids as in a foam-like dispersion. Table 1 summarizes some of the results predicted for $\rho_{foam}$ and the $\int dP/\rho_{foam}$ term at different operating conditions. The results also show the flexibility of operation possible by using glycols and their mixtures with water vs. using water only.

My invention requires that the deep liquids be at least saturated with gases. Because of economical reasons it becomes of paramount importance to known the estimated power required, "the cost", to supply and incorporate gases (air for example) into the deep liquids by mechanical compression. Table 2 and 3 summarize the results predicted from the mechanical energy balance for different operating conditions together with the power recovered. Indeed the results are very attractive and show that my method and apparatus are commercially feasible, especially when using ethylene glycol and/or its mixtures with water. Similar results are obtainable using the high alcohols. The calculations were made assuming a compressor efficiency of 80% which is realistic.

The density inside the foam pipe will decrease from the density of the liquid before incipient foaming. That density is approximately 62.4 $lb_m/ft^3$ when working with water or approximately 70 $lb_m/ft^3$ when working with homologs of ethylene glycol or propylene glycols and the high alcohols. The minimum bulk density occurs when the foam reaches the discharge end of the pipe, an instant before the gases are disengaged and released to the atmosphere. That bulk density will be approximately 26 $lb_m/ft^3$ when working with water or values approaching 5 $lb_m/ft^3$ when using the homologs of ethylene and propylene glycols and the higher alcohols as the working fluids. The force balance at the depth of incipient foaming results in the following relationship.

Static or equilibrium foam column height (m) = incipient foaming depth (m) x (density of outside liquid minus bulk density of foam column) divided by the bulk density of foam column. The density terms in $lb_m/ft^3$.

This equation may be used to estimate the foam static head momentarily at equilibrium at whatever gas concentration levels are under consideration in the deep liquids. Since the foam density is so important and varies along the foam pipe, it is necessary to determine a weighted average value for the foam density. This can be done by performing the $\int dP/\rho_{foam}$ using the definition for the density. Using one liter as basis: Density of foam at any depth inside the pipe $(lb_m/ft^3) = 1000X(s.g.)X62.4/$ 1000 ml + PHI + 1)X-GASX((SXSG + 10.35)/(10.07X1.0128))--GASXP))/P.

Therefore the bulk average $\rho_{foam} = \Delta P/\int dP/\rho_{foam}$ where:

PHI = excess gas above saturation, mL gas @ STP/L-atm
S = depth of effervescence, meters
sg = specific gravity
P = pressure, atms
X = timer
GAS = solubility, ml gas @ STP/L-atm Using the mechanical energy balance permits the estimate of foam velocities of approximately 200 ft/sec when the foam reaches the discharge end of the pipe on its way up the conduit. That velocity can be utilized as kinetic energy to move impulse turbines. Also, the liquid flow and the diameter required for the foam pipe for the desired operating conditions can be estimated.

Contrary to the systems previously proposed, my method is a hydraulic process operating on bodies of deep liquids in inland deep cavities, free of the usual concerns about the weather which is a primary consideration for ocean installations. The bodies of deep liquids inland can be man-made such as deep wells or deep excavations which are lined and filled with a desired liquid. Some mines have vertical ventilation shafts and/or elevator shafts over 3000 ft deep. Thus, inland cavities as well as the needed technology are available to make bodies of deep liquids to the specifications required by my invention. The wells or excavations would be lined thus becoming seepage-proof to prevent seepage leading to contamination of subterranean bodies of water. My invention lends itself to a perpetual, completely self-contained, clean energy source without any contamination of the environment. All the water used in the process, except the water evaporated at the cooling towers, is recycled back to the body of deep liquid, after passing through the turbines, via a cooling tower.

My method and apparatus circumvent the thermal limitations imposed by the second law of thermodynamics upon thermal processes, such as OTEC, and eliminates: a) the monstrous surface water flows and the huge structures required to process them; b) the vast heat transfer surfaces and their inherent susceptibility to bio-fouling which ruins the heat transfer processes; and c) the absolute need to remove the non-condensable gases dissolved in the water. Indeed, in my method non-condensable gases are welcome, the more the better! Dissolved gases do not adversely affect my system. Additionally, the present invention markedly reduces the size of the pipe through which the deep liquid flows. Foam pipe diameters ranging from 5 feet up to perhaps 30 feet are sufficiently large for my system to recover from 100 to more than 1000 mega-watts of electricity (MWe).

The reduction of the deep water pipe diameters from the larger pipes required by OTEC to more manageable sizes of from about 5 to 30 feet, or about 2 to 10 meters, for my system is in itself a large accomplishment. The opportunity to use smaller diameter pipes is especially important for land installations where the deep bodies of liquids will be man-made. Because smaller pipes can be used, the excavations required for my method can be smaller and more economical.

Table 3 compares typical results estimated for DLEC when operating at different incipient foaming depths and utilizing different foam pipe diameters. This table includes data for water, ethylene glycol and mixtures thereof. One could also use a variety of other organic liquids and aqueous mixtures thereof. Table 4 contains a list of a few of the many other liquids which could be used. For each liquid I provide the liquid's solubility and vapor pressure as well as the viscosity of a 50% aqueous mixture thereof. This and similar data for other suitable liquids is available in the published literature.

An important fact to consider in selecting the relative proportions of glycol or other organic liquid and water is the freezing point of the proposed mixture and the temperatures which occur in the geographic area of operation. Typical mixtures should be 50% to 90% glycol.

I prefer to keep the operating temperatures of my system at approximately 100° F. to prevent the mixture from becoming too sluggish. Even if some of the energy produced by my system is needed to warm the liquid, my system is very cost effective.

I further prefer to use organic liquids which have low volatility to prevent their evaporation in the cooling tower. Hence, no contamination of the environment will occur.

Because there are so many glycols and other organic liquids which are suitable for my system, cost and availability can be considered in selecting a liquid. The glycols listed in Table 4 are among the most common and lowest cost glycols.

In the preferred embodiments the deep cavity is open at ground level. A similar action could be achieved by providing vent channels to the cavity. Furthermore, a vented cover could be placed over the ground level opening.

Although I have disclosed certain present preferred embodiments of my method for recovering energy from deep liquid in deep cavities using structures it should be distinctly understood that my invention is not limited thereto but may be variously embodied within the scope of the following claims.

TABLE 1

EFFECT OF THE DEPTH OF EFFERVESCENCE AND THE CONCENTRATION OF GASES IN THE LIQUIDS UPON THE $p_{foam}$ and $\int dP/p_{foam}$

| Depth of Effervescence meters | Liquid | Gas mL/L-Atm. | $p_{foam}$ lb$_m$/ft$^3$ | $\int dP/p_{foam}$ lb$_f$-ft/lb$_m$ |
|---|---|---|---|---|
| 300 | water | 14.3 | 58.61 | −1046.56 |
| 500 | " | 14.3 | 58.25 | −1755.06 |
| 1000 | " | 14.3 | 57.75 | −3540.53 |
| 300 | " | 28.6 | 55.97 | −1096.01 |
| 300 | " | 42.9 | 53.55 | −1145.47 |
| 300 | " | 57.2 | 51.34 | −1194.93 |
| 300 | Ethylene Glycol | 120 | 44.97 | −1527.88 |
| 500 | Ethylene Glycol | 120 | 43.41 | −2637.85 |
| 1000 | Ethylene Glycol | 120 | 41.39 | −5532.60 |
| 300 | Ethylene Glycol | 180 | 39.45 | −1741.31 |
| 300 | Ethylene Glycol | 240 | 35.15 | −1954.75 |
| 300 | Ethylene Glycol Glycol/Water mixtures | 300 | 31.68 | −2168.18 |
| 300 | 25/75 | 40.7 | 54.49 | −1165.03 |
| 300 | 50/50 | 67.1 | 51.12 | −1285.07 |
| 300 | 75/25 | 94.0 | 47.83 | −1408.20 |

TABLE 2

CHARACTERISTICS OF DLEC AT DIFFERENT OPERATING CONDITIONS
Foam Pipe Dia. = 10 ft.

| Depth of Effervescence meters | Liquid | Gas mL/L-Atm | TPR** MWe | NPR*** MWe | "Cost"* % TPR |
|---|---|---|---|---|---|
| | | Saturation | | | |
| 300 | Water | 14.3 | 147 | −8 | 100.3 |
| 500 | " | 14.3 | 139 | 14 | 89 |
| 1000 | " | 14.3 | 152 | 56 | 63 |
| | | Excess Gas Above Saturation | | | |
| 300 | " | 5 X | 213 | 116 | 46 |
| 500 | " | 5 X | 252 | 162 | 36 |
| 1000 | " | 5 x | 364 | 271 | 26 |
| | Ethylene | Saturation | | | |
| 300 | Ethylene Glycol | 120 | 253 | 183 | 28 |
| 500 | Ethylene Glycol | 120 | 313 | 257 | 18 |
| 750 | Ethylene Glycol | 120 | 390 | 342 | 12 |
| 1000 | Ethylene Glycol Glycol/ Water + Mixtures | 120 | 464 | 420 | 9 |
| | | Saturation | | | |
| 500 | 25/75 | 40.7 | 220 | 129 | 41 |
| " | 50/50 | 67.1 | 260 | 186 | 29 |
| " | 75/25 | 94 | 290 | 225 | 22 |

*(TPR − NPR)/TPR
**TPR = Total Power Recovered
***NPR = Net Power Recovered
+ Mixtures in Proportions by Weight

TABLE 3

CHARACTERISTICS OF DLEC AT DIFFERENT DIAMETERS OF THE FOAM PIPE

| Depth of Effervescence meters | Liquid Flow lb$_{m/sec.}$ | Gas SCFM | Foam Pipe Dia. Ft. | TPR MWe | NPR MWe | "Cost" % TPR |
|---|---|---|---|---|---|---|
| \multicolumn{7}{l}{Water saturated at 14.3 ml gas STP/L-Atm:} |
| 300 | 1.17 E5 | 4.83 E4 | 5 | 24 | −9 | 136 |
|  |  |  | 10 | 147 | −8 | 105 |
|  | 1.36 E6 | 6.63 E5 | 15 | 402 | 26 | 93 |
|  |  |  | 20 | 802 | 103 | 87 |
|  | 4.51 E6 | 2.22 E6 | 25 | 1578 | 304 | 80 |
| 500 | 9.53 E4 | 6.47 E4 | 5 | 23 | −4 | 116 |
|  |  |  | 10 | 139 | 14 | 89 |
|  | 1.09 E6 | 7.43 E5 | 15 | 376 | 75 | 80 |
|  |  |  | 20 | 748 | 189 | 75 |
|  | 3.25 E6 | 2.21 E6 | 25 | 1260 | 363 | 71 |
| 1000 | 7.46 E4 | 1.01 E5 | 5 | 25 | 5 | 80 |
|  |  |  | 10 | 152 | 56 | 63 |
|  | 8.31 E5 | 1.12 E6 | 15 | 402 | 174 | 57 |
|  |  |  | 20 | 790 | 368 | 53 |
|  | 2.44 E6 | 3.28 E6 | 25 | 1319 | 641 | 51 |
| \multicolumn{7}{l}{Ethylene Glycol saturated at 120 ml gas STP/L-Atm:} |
| 300 | 6.34 E4 | 2.45 E5 | 5 | 60 | 43 | 29 |
|  |  |  | 10 | 255 | 183 | 28 |
|  | 5.83 E5 | 2.25 E6 | 15 | 580 | 419 | 28 |
|  |  |  | 20 | 1039 | 753 | 27 |
|  | 1.63 E6 | 6.28 E6 | 25 | 1631 | 1183 | 27 |
| 500 | 5.16 E4 | 3.28 E5 | 5 | 74 | 62 | 19 |
|  |  |  | 10 | 314 | 256 | 18 |
|  | 4.71 E5 | 2.99 E6 | 15 | 715 | 585 | 18 |
|  |  |  | 20 | 1277 | 1046 | 18 |
|  | 1.31 E6 | 8.36 E6 | 25 | 2000 | 1641 | 18 |
| 1000 | 3.91 E4 | 4.93 E4 | 5 | 112 | 103 | 9 |
|  |  |  | 10 | 464 | 421 | 9 |
|  | 3.55 E5 | 4.48 E6 | 15 | 1050 | 953 | 9 |
|  |  |  | 20 | 1872 | 1699 | 9 |
|  | 9.88 E5 | 12.45 E6 | 25 | 2933 | 2661 | 9 |

TABLE 4

LIQUIDS OTHER THAN WATER THAT COULD BE USED IN DLEC

| | Viscosity @ 100° F. 50% wght. mix. Glycol/water cps | Solubility % wght. 20° C. Glycol/Water | Vapor Pressure mm Hg @ 20° C. |
|---|---|---|---|
| Ethylene glycol | 3 | complete | <0.1 |
| Diethylene glycol | 3 | complete | <0.01 |
| Triethylene glycol | 3 | complete | <0.01 |
| Tetraethylene glycol | 5 | complete | <0.01 |
| Propylene glycol | 3 | complete | <0.1 |
| Dipropylene glycol | 4 | complete | <0.01 |
| Hexylene glycol | 5 | complete | <0.1 |
| 1,5 Pentanediol | 8 | complete | <0.01 |

I claim:

1. A method of creating an upward flow of liquid from a deep cavity the liquid having a bulk density and a pressure and containing gases dissolved therein, comprising the steps of positioning in the liquid in said deep cavity a substantially vertical conduit having open upper and lower ends with the upper end positioned above a surface of the liquid and the lower end located within the liquid where the pressure is substantially greater than atmospheric pressure, drawing sufficient liquid from the upper end of the conduit to cause the liquid containing gas in the deep cavity to enter the lower end of the conduit and release dissolved gas thereby forming a foam which reduces the bulk density of the liquid which in turn causes the foam to move upward through the conduit as a result of liquid outside the conduit pushing the foam to higher heights in an effort to reach pressure equilibrium inside and outside the conduit at a level of incipient foaming and continuously pumping at least one gas into the liquid at the lower end of the conduit so that the liquid is saturated at concentration levels higher than concentration levels of gases in surface liquid.

2. The method of claim 1, including the step of introducing the moving foam into hydraulic means for extracting power therefrom.

3. The method of claim 2 in which the hydraulic means include at least one turbine.

4. The method of claim 2 in which the hydraulic means include at least one Pelton wheel.

5. The method of claim 1 including the step of separating gases from the foam and directing the liquid into one of a turbine or a Pelton wheel.

6. The method of claim 1 including the step of providing a lining around the underground cavity.

7. The method of claim 6 also comprising the step of providing a retaining wall around the cavity such that the lining is within an area which is surrounded by the retaining wall.

8. The method of claim 1 also comprising the step of injecting gas into the liquid near the lower end of the conduit.

9. The method of claim 1 also comprising the steps of separating the foam into the liquid and gases and returning the liquid to the deep cavity.

10. The method of claim 1 wherein the liquid is selected from the group of liquids comprised of water, alcohols, glycols and mixtures thereof.

11. The method of claim 10 wherein the liquid is an aqueous mixture of from 50% to 90% of at least one of an alcohol or a glycol.

12. The method of claim 1 wherein the liquid is a mixture of water and at least one glycol and also comprising the steps of
 a) separating the foam into the liquid and gases;
 b) evaporating at least some water from the liquid to form a recycle liquid; and
 c) returning the recycle liquid to the deep cavity.

13. An apparatus for recovering energy from a liquid in an underground cavity, the liquid having a bulk density and a pressure and containing gases dissolved therein comprising:
 a) a platform,
 b) a conduit attached to the platform extending from a point above the platform to a point below the platform, wherein the conduit is long enough so that a lower end of the conduit extends into the liquid containing dissolved gases and the conduit has a diameter such that when the liquid is drawn from the conduit dissolved gas will be released from the liquid forming a foam which rises in the conduit as a result of liquid outside the conduit pushing the foam to higher heights in an effort to reach pressure equilibrium inside and outside the conduit at a level of incipient foaming,
 c) means for drawing liquid from an upper end of the conduit,
 d) means for pumping at least one gas into the liquid at the lower end of the conduit so that the liquid is saturated at concentration levels higher than concentration levels of gases in surface liquid, and
 e) means for extracting power from at least a portion of the foam, the means being attached to the conduit.

14. The apparatus of claim 13 wherein the diameter of the conduit is up to 10 meters.

15. The apparatus of claim 14 also comprising a pipe extending from ground level to a point near the lower end of the conduit and a compressor attached to the pipe for blowing gas through the pipe into the liquid near the lower end of the conduit to produce liquid containing dissolved gases so that the liquid containing the dissolved gas can enter the lower end of the conduit.

16. The apparatus of claim 13 wherein the means for extracting power from the foam is at least one turbine.

17. The apparatus of claim 13 wherein the means for extracting power from the foam is at least one Pelton wheel.

18. The apparatus of claim 13 also comprising a foam breaker attached to the conduit.

19. The apparatus of claim 13 wherein the cavity is lined to prevent seepage of the liquid therefrom.

20. The apparatus of claim 13 also comprising a cooling tower connected to receive liquid from the means for extracting power.

21. The apparatus of claim 13 also comprising means for recycling liquid to the cavity.

22. The apparatus of claim 13 also comprising a retaining wall surrounding the cavity.

* * * * *